No. 781,139. PATENTED JAN. 31, 1905.
W. J. FINLAY.
TRACTION ENGINE COUPLING.
APPLICATION FILED APR. 23, 1904.
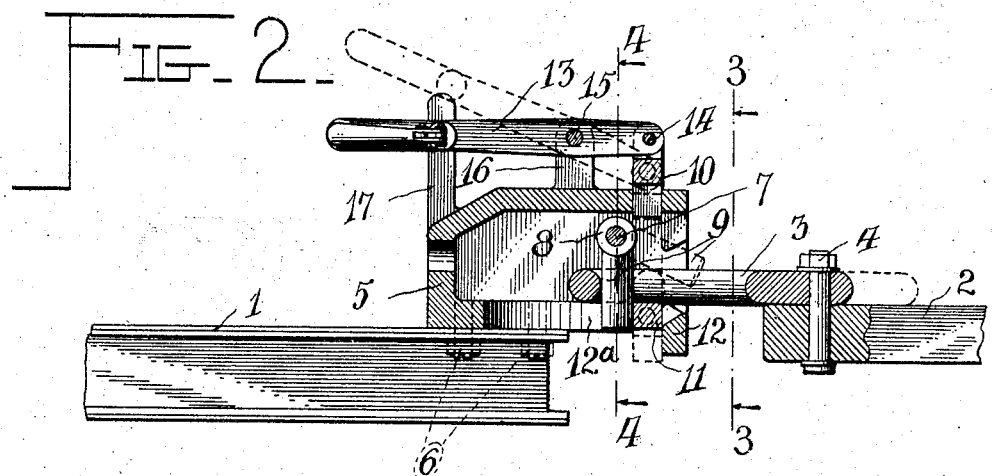
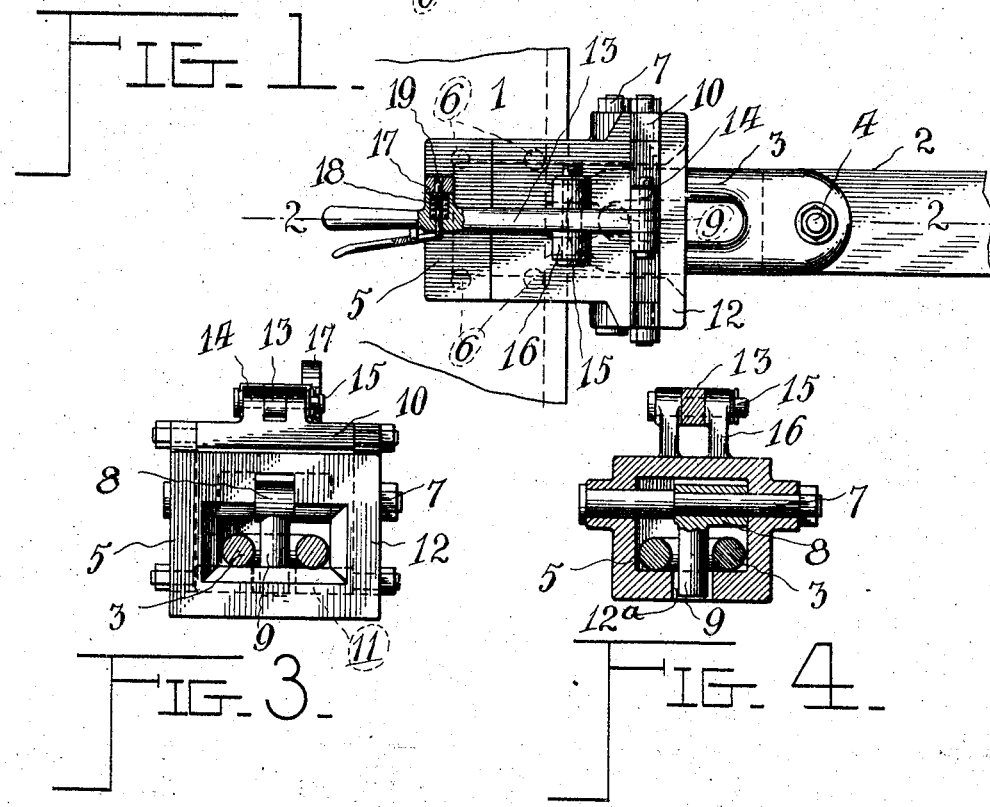
Witnesses:
William J. Finlay  Inventor,
By Marion & Marion
Attorneys No. 781,139.	Patented January 31, 1905.

UNITED STATES PATENT OFFICE.

WILLIAM JOHN FINLAY, OF KILLARNEY, CANADA.

TRACTION-ENGINE COUPLING.

SPECIFICATION forming part of Letters Patent No. 781,139, dated January 31, 1905.

Application filed April 23, 1904. Serial No. 204,519.

*To all whom it may concern:*

Be it known that I, WILLIAM JOHN FINLAY, a subject of the King of Great Britain, residing at Killarney, county of Turtle Mountain, Province of Manitoba, Canada, have invented certain new and useful Improvements in Traction-Engine Couplers; and I do hereby declare that the following is a full, clear, and exact description of the invention, such as will enable others skilled in the art to which it appertains to make and use the same.

This invention relates to new and useful improvements in couplings for traction-engines, and comprises means whereby a tender may be coupled to a traction-engine.

The object of the invention is to produce a coupling for the purpose described which will be substantially automatic in its operation and which will couple a traction-engine and tender or other conveyance adapted to be connected therewith, the parts being simple in construction and durable in use and so united as to be readily separated for the purpose of repairs or renewal.

Referring to the annexed drawings, in which similar numerals of reference indicate corresponding parts, Figure 1 is a top plan view of my improved coupler, shown attached to a fragment of the engine-platform. Fig. 2 is a longitudinal vertical section thereof, taken on line 2 2 of Fig. 1. Fig. 3 is a section on line 3 3 of Fig. 2 looking in the direction indicated by the arrows, and Fig. 4 is a section on line 4 4 of Fig. 2 looking in the direction indicated by the arrow.

Referring to the drawings, 1 indicates the rear platform of a traction-engine; 2, the draw-bar, which may extend to a tender, and 3 is a coupling-link, which may be pivotally connected with the draw-bar 2 by means of the pin 4.

5 is a housing secured, by means of the bolts 6, to the platform 1, the said housing comprising an inner chamber extending substantially the length thereof and outer inclosing walls forming sides and top portions thereof, while the forward or coupling end of the housing is left open for the passage of the coupling-link 3. Extending transversely through the housing 5 is a supporting pin or rod 7, upon which rod is pivotally supported an approximately T-shaped gravity coupling-pin 8, terminating in the vertically-disposed portion 9, which is adapted to interlock with the link 3. The housing 5 is provided in each of its side walls with a vertically-projected channel, in which is slidably held a yoke 10, said yoke terminating at its lower end in the cross-bar 11, which lies in close proximity to the outer end portion 12 of the housing. The housing 5 being cut away at its lower side, as indicated at $12^a$, permits the pin 9 to swing upon its pivot 7 freely in a rearward direction—that is, in a direction toward the platform 1—and when the cross-bar 11 of the yoke 10 is in the position indicated by the dotted lines in Fig. 2 the pin may swing freely forwardly, as indicated by the dotted lines in said Fig. 2.

Connected with the yoke 10 is a lever 13, which is pivoted at 14 to the upward extension of said yoke and is pivoted at 15 to upwardly-extending lugs 16, projecting vertically above the housing 5. When the lever 13 is in the lowermost position—that is, the position shown in full lines in Fig. 2—the transverse bar 11 of the yoke 10 serves as a stop to prevent forward movement of the pin 9 upon its pivot; but when the lever 13 is thrown to the position indicated by the dotted lines in Fig. 2 it is evident that the transverse bar 11 will be depressed to the position indicated by the dotted lines in said figure, thereby removing the stop for the forward movement of the pin 9 and permit disengagement of the link 3, if desired. To secure the lever 13 in its normal or lower position, suitable securing means should be connected therewith, which may comprise a hook on said lever 13, engaging with the post 17, or said post 17 may be provided with a ratchet adapted to engage with the lever 13, or a reciprocatory pin 18 may project transversely through the lever 13 into an opening 19 or any one of the series of openings, as 19, in the standard 17, whereby said lever may be held in relatively fixed position when desired.

The operation of my improved coupling is as follows: The lever 13 being locked in its lower position, the tender may be brought into proximity with the traction-engine and the link be caused to project through the open end of the housing 5 and rock the pin 9 upon its pivot 7 rearwardly until the advance end of the link has passed the said pin, whereupon said pin 9 will drop by gravity into the open eye of the link. Draft from the engine will be transmitted through the coupling-pin 9 to the link 3, thence to the draw-bar 2 of the tender, the pin 9 abutting against the transverse bar or stop 11 and prevent the said pin passing forwardly of an approximately vertical position. When it is desired to uncouple the link 3, all that is necessary is to raise the lever 13, whereupon the transverse stop 11 will be depressed out of and away from the path of the pin 9, whereupon said pin may swing upon its support sufficiently to permit the link 3 to be withdrawn from the housing 5.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In a coupling for traction-engines, a housing having an opening at one end and in its bottom, a coupling-pin pivotally mounted in said housing, a yoke slidable upon said housing, a stop member on said yoke adapted to serve as a stop for said coupling-pin, and means for moving the said yoke and stop member.

2. In a coupling for traction-engines, a housing, a transverse pivot therein, an approximately T-shaped pin carried upon said pivot, a yoke slidable on said housing, a transverse member on said yoke adapted to serve as a stop for said pin, and a pivoted lever connected with said stop.

3. In a coupling for traction-engines, a housing, an approximately T-shaped pin therein having a perforated transverse member, a pivot-pin projecting through said housing and the perforation in said pin, a stop-yoke movable into alinement with said pin, and a pivoted lever connected with said yoke.

4. In a coupling for traction-engines, a housing having an opening at one end and in its bottom, a transverse pin projected through said housing, a coupling-pin pivotally supported on said transverse pin, a stop-yoke slidable vertically into position to serve as a stop for said pin, and a lever pivotally connected therewith.

In witness whereof I have hereunto set my hand in the presence of two witnesses.

WILLIAM JOHN FINLAY.

Witnesses:
J. W. SMAILL,
DAVID N. FINLAY.